US006826542B1

(12) United States Patent
Virgin et al.

(10) Patent No.: US 6,826,542 B1
(45) Date of Patent: Nov. 30, 2004

(54) SYSTEM AND METHOD FOR COLLECTING, ENHANCING AND DISTRIBUTING INVOICES ELECTRONICALLY VIA THE INTERNET

(75) Inventors: Kenneth L. Virgin, Aliso Viejo, CA (US); Jonathan M. Titel, Aliso Viejo, CA (US); Robert L. Ripley, Trabuco Canyon, CA (US)

(73) Assignee: iPayables, Inc., Lake Forest, CA (US)

( * ) Notice: Subject to any disclaimer, the term of this patent is extended or adjusted under 35 U.S.C. 154(b) by 801 days.

(21) Appl. No.: 09/721,570

(22) Filed: Nov. 22, 2000

Related U.S. Application Data
(60) Provisional application No. 60/167,103, filed on Nov. 23, 1999.

(51) Int. Cl.[7] .............................................. G06F 17/16
(52) U.S. Cl. ............................... 705/34; 705/4; 705/40
(58) Field of Search ............................. 705/26, 34, 29, 705/2, 3, 4, 40

(56) References Cited

U.S. PATENT DOCUMENTS

| | | | | |
|---|---|---|---|---|
| 5,890,129 A | * | 3/1999 | Spurgeon ....................... | 705/4 |
| 5,956,700 A | * | 9/1999 | Landry ......................... | 705/34 |
| 5,963,925 A | * | 10/1999 | Kolling et al. ................ | 705/34 |
| 6,044,362 A | * | 3/2000 | Neely .......................... | 705/34 |
| 6,058,380 A | * | 5/2000 | Anderson et al. ............. | 705/40 |
| 6,070,150 A | | 5/2000 | Remington et al. | |
| 6,304,857 B1 | * | 10/2001 | Heindel et al. ................ | 705/34 |

FOREIGN PATENT DOCUMENTS

| | | | | |
|---|---|---|---|---|
| WO | WO 99/15999 | * | 4/1999 | .......... G06F/17/60 |
| WO | WO 00/33227 | * | 6/2000 | .......... G06F/17/60 |

OTHER PUBLICATIONS

Goldsborough, Reid "Look Your Best When Billing Customers" Jun. 1994, PC Today, v8n6 p. 25(3), Dialog file 256 (00066423).*
Patel et al. "Payment By Electrons" Jul. 1998, Information Week, v693 p. 69 (4), Dialog file 256 (00109695).*
M2 Presswire "EDS and Bank One Bring Industry–Leading Interactive Billing to Commercial Clients" May 1999, Dialog file 20 (04679643).*

* cited by examiner

Primary Examiner—Kenneth R. Rice
Assistant Examiner—Lynda Jasmin
(74) Attorney, Agent, or Firm—Knobbe, Martens, Olson & Bear, LLP

(57) ABSTRACT

The present invention is a central invoicing system. Payors and invoicers can use the central invoicing system by connecting to it by a network, such as the Internet, and using an interaction device, such as a personal computer with web browsing software. Payors can create, on the central invoicing system, a list of invoicers from whom they wish to receive invoices. The system sends invitations, including a user name and password, to the selected invoicers to enroll with the central invoicing system. The system provides invoicers with a facility to enroll with the central invoicing system over the Internet. Payors can also customize the format of the invoices they are to receive from the selected invoicers. The central invoicing system stores each payor's particular invoicing format on a server. The system allows an invoicer to connect to the system through the Internet to create invoices. The invoicer can then submit that invoice to the payor through the system. The system formats the invoice according to the payor's desired invoice format and transmits the invoice to the payor's financial system. The system may also retain the invoice on the server and notify the appropriate payor. Once notified, the payor may access the central invoicing system to view, process, and approve the invoice. If the payor approves the invoice, the invoice is transmitted to the payor's financial system.

23 Claims, 15 Drawing Sheets

Fig. 5b

Route ID: 123456
Route Type: ⊙ Serial  ○ Parallel

Description

Primary Criteria

| Company | Operator | Value | |
|---|---|---|---|
| ▼ | Equals ▼ | | ADD |

Defined Criteria

| Department Equals "ABC" | DEL |
| | AND |
| | OR |

Stops

| Criteria | User | |
|---|---|---|
| Primary Criteria | Bob Jones | ADD |
| Total Due > $10,000 | Jane Smith | EDIT |
| | | DELETE |
| | | ◄ |
| | | ► |

Fig. 6b

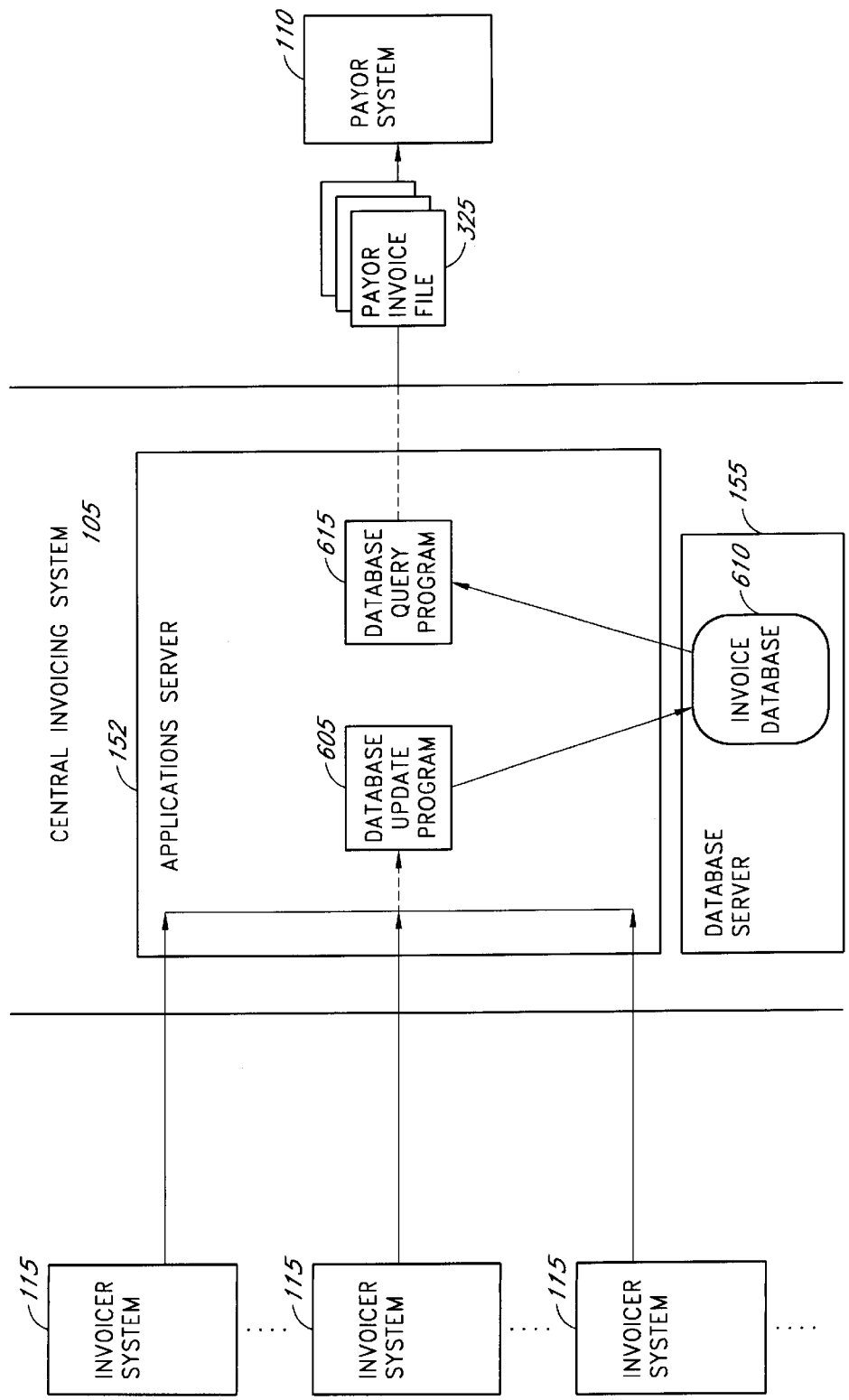

SYSTEM AND METHOD FOR COLLECTING, ENHANCING AND DISTRIBUTING INVOICES ELECTRONICALLY VIA THE INTERNET

REFERENCE TO RELATED APPLICATION

The present application claims priority benefit under 35 U.S.C. §119(e) from U.S. Provisional Application No. 60/167,103 filed Nov. 23, 1999, entitled "SYSTEM AND METHOD FOR COLLECTING, ENHANCING, AND DISTRIBUTING INVOICES ELECTRONICALLY VIA THE INTERNET" which is herewith incorporated by reference.

BACKGROUND OF THE INVENTION

1. Field of the Invention

The present invention relates in general to an automated invoicing system and in particular to an Internet-based electronic invoice presentment system.

2. Description of the Related Art

A common activity for any business is to receive and pay several invoices from their outside suppliers or creditors ("invoicers") every month. These invoicers usually include utility companies, outside contractors, suppliers, banks, and other external service providers. The business receiving these invoices ("payor"), often spends a considerable amount of time processing and making payments on the invoices.

If there is a dispute between the payor and the invoicer, a significant amount of time may be spent resolving that dispute. For example, the payor often must contact the invoicer either by phone or alternatively return the invoice with an explanation of the dispute. The two parties then proceed to resolve the dispute and usually a corrected invoice is then submitted or the invoice is abandoned.

Once the invoice is acceptable, the payor makes a check for the invoice amount and, together with the invoice, mails it back to the invoicer. Or, the payor may have another payment arrangements with the invoicer. Both the invoicer and the payor incur substantial costs in billing and paying for invoices in this manner.

Attempts have been made to automate this process through the use of computer systems that receive and transmit invoices between invoicers, payors, and financial institutions. However, these systems generally do not provide an efficient means of dealing with the invoicing process.

One problem is the incompatibility of the systems used by different parties. Often computer invoicing systems require a translator at the payor's system to convert the invoice information received into the payor's internal accounting system. This adds a level of complexity to the process and requires the payor to have a sophisticated and modifiable internal accounting system. It may also require the expense of hiring a programmer. Furthermore, if, in the future, there is a change in the format of invoice information coming in, the translator would have to be modified and this increases the cost of maintaining the system.

Moreover, often times a payor is only disputing certain items in the invoice and not the entire invoice. In some current systems, the entire invoice is disputed and sent back to the invoicer. Thus, some current systems may fail to remit payment for the undisputed items. Furthermore, the invoicer does not become aware of the reasons for the rejection of the disputed items until the invoice is received back at the invoicer. This often delays the invoicing process at a great cost to the invoicer. The invoicer's cash flow is adversely affected as undisputed items are not paid. The payor also incurs costs because they will have to deal with the same invoice on several occasions.

Another problem with the current available systems is that they do not take into account that payors often have internal, rule-based, multi-level approval systems for invoice processing. In other words, the payor company often has an internal hierarchy and procedure for approval of invoices before payments are made. For example, certain invoices can only be approved by a certain employee or a class of employees and other invoices can only be approved by another class of employees. Often a significant amount of time and labor is wasted when the invoices go to the wrong person in the payor company or pass between several persons in the payor company.

Also, the current attempts to automate the invoicing process fail to allow the payor to customize the format in which invoices are received. Often times it is the invoicers that dictate how an invoice is to be presented and how, if at all, the payor can dispute the invoice.

SUMMARY OF THE INVENTION

The present invention is a system for automated invoicing. One aspect of the invention is to provide a payor-based approach to electronic invoicing. The invention provides a flexible system for payors to customize the format of their invoices, view each invoice item by item, and approve or dispute those invoices on an item by item basis.

Another aspect of the invention eliminates the need for a translation or conversion program to reside on the payor's internal financial system. This aspect of the invention works to simplify and downsize the payor's internal financial system. This aspect of the invention also eliminates the need for a translation or conversion program to reside on the invoicer's system. Thus, this aspect of the invention also works to simplify and downsize the invoicer's system.

Another aspect of the invention authenticates that the invoice came from an approved invoicer and that the invoice is in the payor's desired format. The invention then consolidates the invoices from all of the payor's invoicers into one file to be transmitted to the payor. This aspect prevents erroneous invoices from reaching the payor's system.

Another aspect of the invention allows the payor to establish a rule-based, multi-level invoice authorization, approval, and routing process according to the payor's internal invoice approval hierarchy. This aspect ensures that only the appropriate people in the payor's organization approve the payment of an invoice and that the system is secure against abuse.

Another aspect of the invention allows invoicers to view the payment status of their invoices over the Internet with the use of a web browser. The system will indicate if the invoice has been received, approved, partially approved, or disputed and the reasons for the dispute, if any. This aspect creates an efficient and accurate method for invoicers to check payment status of invoices. Further, this aspect of the invention, in the event of a dispute, allows the invoicer to be notified in a timely manner along with the reasons for the dispute. This allows the invoicer to resolve the dispute quicker, thus improving invoicer's cash flow and client relations.

Another aspect of the invention gives functionality to the invoicer to redirect their printer stream to supply invoice information for invoicing the payor in the same manner that the invoicer would print to a printer. This aspect makes submitting invoices to customers as easy as printing invoices on a printer.

For purposes of summarizing the invention, certain aspects, advantages and novel features of the invention have been described herein. Of course, it is to be understood that not necessarily all such aspects, advantages or features will be embodied in any particular embodiment of the invention.

BRIEF DESCRIPTION OF THE DRAWINGS

The present invention is described in more detail below in connection with the attached drawings, which are meant to illustrate and not to limit the invention, and in which:

FIGS. 5A and 5B illustrate diagrams of an invoice approval system and an invoice approval rules entry screen according to aspects of an embodiment of the invention.

FIGS. 6A and 6B illustrate a process flow diagram of an invoice generation and transmission process and a diagram of an invoice entry screen, according to aspects of an embodiment of the invention.

FIG. 7 illustrates a block diagram of an invoice file consolidation system, according to aspects of an embodiment of the invention.

DETAILED DESCRIPTION OF THE PREFERRED EMBODIMENT

One aspect of the present invention is to provide a system for collecting, enhancing, and distributing invoices electronically via the Internet. Invoicers and payors can access the functionality of a central invoicing system through a communication medium, such as the Internet. The invoicing system is payor-based, thus, the payor can access the system and customize the format in which the payor wishes to receive invoices. The payor can also customize the invoice approval and routing process. An invoicer can access the system and create an invoice that is then transmitted to the payor through the invoicing system. An invoicer may also upload an invoice file to the system for submission to one or more payors. An invoicer may also send invoices from its current billing system directly to the invoicing system.

To facilitate a complete understanding of the invention, the remainder of the detailed description describes the invention with reference to the figures, wherein like elements are referenced with like numerals throughout.

Figure 1:
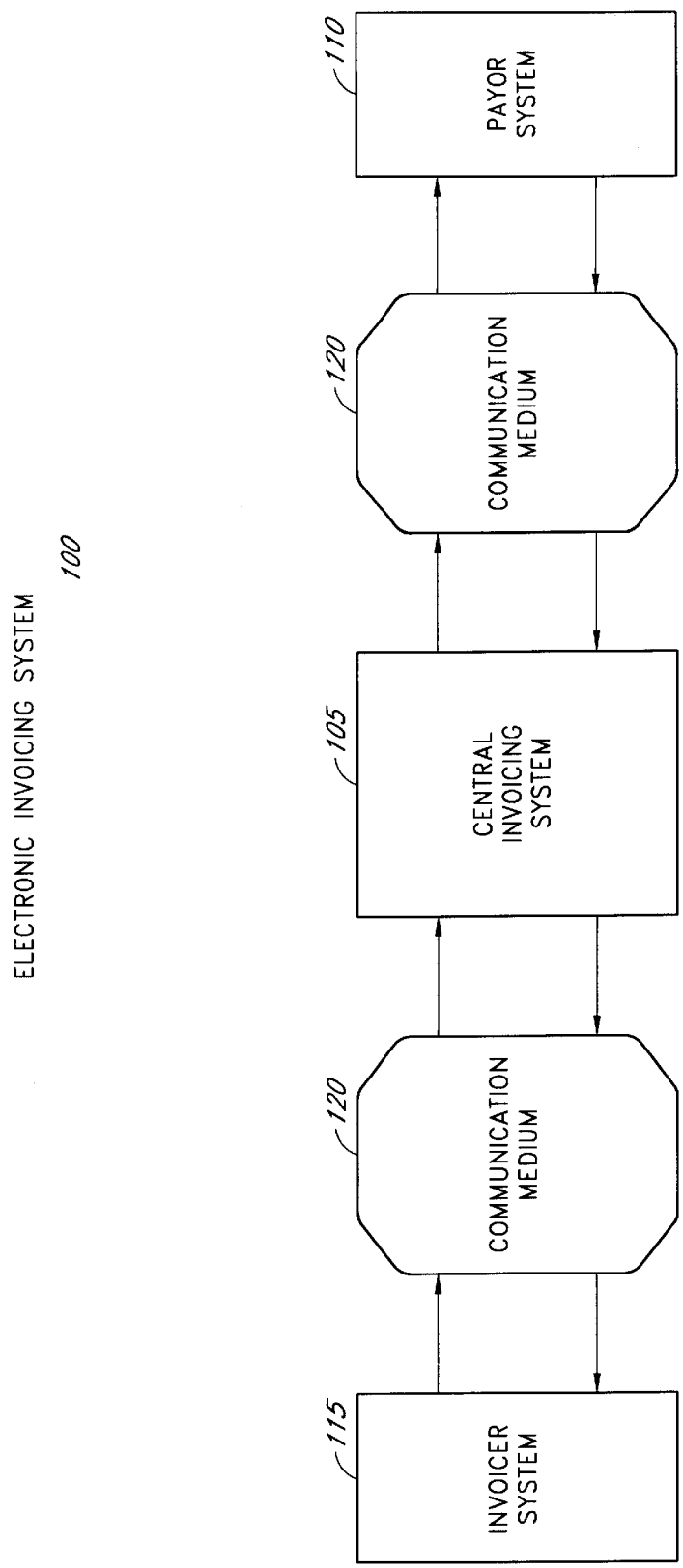
FIG. 1 illustrates a high level block diagram of an electronic invoicing system, according to aspects of an embodiment of the invention.

FIG. 1 illustrates a high level block diagram of an electronic invoicing system 100, according to aspects of an embodiment of the invention. As shown in FIG. 1, the invoicing system 100 includes a central invoicing system 105, a payor system 110, and an invoicer system 115, communicating through a communication medium 120.

FIG. 1 illustrates the central invoicing system 105. According to one embodiment, the central invoicing system 105 comprises one or more secure servers for accessing and storing sensitive information such as the payor and invoicer authentication data and invoice information. According to one embodiment, the authentication data includes data designed to uniquely identify the payors and the invoicers who use the central invoicing system 105.

According to one embodiment of the invention, the payor system 110 comprises a conventional general purpose computer using one or more microprocessors such as, for example, an Intel-based processor. Moreover, the payor system 110 includes an appropriate operating system such as, for example, an operating system capable of including graphics or windows such as Microsoft Windows, Unix, Linux, or the like.

In addition, the payor system 110 may connect to the communication medium 120 through a conventional service provider, such as, for example, a dial-up connection, digital subscriber line (DSL), cable modem, fiber connection, or the like. In another embodiment, the payor system 110 connects to the communication medium 120 through network connectivity, such as, for example, a local or wide area network. According to one embodiment, the operating system includes a TCP/IP stack that handles all incoming and outgoing message traffic passed over the communication medium 120. The payor system 110 may connect to the central invoicing system 105 using an appropriate secure connection such as a Virtual Private Network (VPN) or a Secure Socket Layer (SSL).

Although the payor system 110 is disclosed with reference to the foregoing embodiment, the invention is not intended to be limited thereby. Rather, a skilled artisan will recognize from the disclosure herein a wide number of alternative embodiments of the payor system 110, including almost any computing device capable of sending or receiving information from another computing device. For example, the payor system 110 may include a computer workstation, an interactive television, an interactive kiosk, a personal mobile computing device (such as a digital assistant), a mobile phone, a mobile computer system, a wireless communication device, an embedded computing device, or any device which can interact with the communication medium 120. In such alternative systems, the operating systems will likely differ and be adapted for the particular device. However, according to one embodiment, the operating systems advantageously continue to provide the appropriate communication protocols needed to establish communication with the communication medium 120.

FIG. 1 illustrates the invoicer system 115. According to one embodiment of the invention, the invoicer system 115 comprises a conventional general purpose computer using one or more microprocessors such as, for example, an Intel-based processor. Moreover, the invoicer system 115 includes an appropriate operating system such as, for example, an operating system capable of including graphics or windows such as Microsoft Windows, Unix, Linux, or the like.

In addition, the invoicer system 115 may connect to the communication link 120 by a conventional service provider such as, for example, a dial-up connection, DSL connection, cable modem, fiber connection, or the like. In another embodiment of the invention, the invoicer system 115 connects to the communication medium 120 through network connectivity such as, for example, a local or wide area network. According to one embodiment, the operating system includes a TCP/IP stack that handles all incoming and outgoing message traffic passed over the communication medium 120. The invoicer system 115 may connect to the central invoicing system 105 by using an appropriate secure connection such as, for example, a Secure Socket Layer (SSL).

Although the invoicer system 115 is disclosed with reference to the foregoing embodiments, the invention is not intended to be limited thereby. Rather, a skilled artisan will recognize from the disclosure herein the wide number of alternative embodiments of the invoicer system 115, including almost any computing device capable of sending or receiving information from another computing device. For example, the invoicer system 115 may include a computer workstation, an interactive television, an interactive kiosk, a personal mobile computing device (such as a digital assistant), a mobile phone, a mobile computer system, a wireless communication device, an embedded computing device, or any device, which can interact with the communication medium 120. In such alternative systems, the operating systems will likely differ and be adaptive for the particular device. However, according to one embodiment, the operating systems advantageously continue to provide appropriate communications protocols needed to establish communication with the communication medium 120.

FIG. 1 also illustrates the communication medium 120 connecting the payor system 110 to the central invoicing system 105, and the invoicer system 115 to the central invoicing system 105. According to one embodiment, the communication medium 120 advantageously comprises the Internet. The Internet as used throughout this disclosure is a global network of computers. The structure of the Internet, which is well known to those of ordinary skill in the art, includes a network backbone with networks branching from the backbone. These branches in turn have networks branching from them and so on. Routers move information packets between network levels, and then from network to network, until the packet reaches the neighborhood of its destination. From the destination, the destination network's host directs the information packet to the appropriate terminal or node. In one advantageous embodiment, the Internet routing hubs comprise domain name system (DNS) servers using Transmission Control Protocol/Internet Protocol (TCP/IP) as is well known in the art. The routing hubs connect to one or more other routing hubs via high speed communication links. One popular part of the Internet is the World Wide Web. The World Wide Web contains different computers which store documents capable of displaying graphical and textual information. The computers that provide information on the World Wide Web are typically called "web sites". A web site is defined by an Internet address that has an associated electronic page. The electronic page can be identified by a Uniform Resource Locator (URL). Generally, an electronic page is a document that organizes the presentation of text, graphics, images, audio, video, and so forth.

Although the communication medium 120 is disclosed in terms of its preferred embodiment, one of ordinary skill in the art will recognize from the disclosure herein that the communication medium 120 may include a wide range of interactive communication links. For example, the communication medium 120 may include interactive television networks, telephone networks, wireless data transmission systems, two-way cable systems, customized private or public computer networks, interactive kiosk networks, automatic machine networks, direct link satellite networks, cellular networks, and the like.

Figure 2:
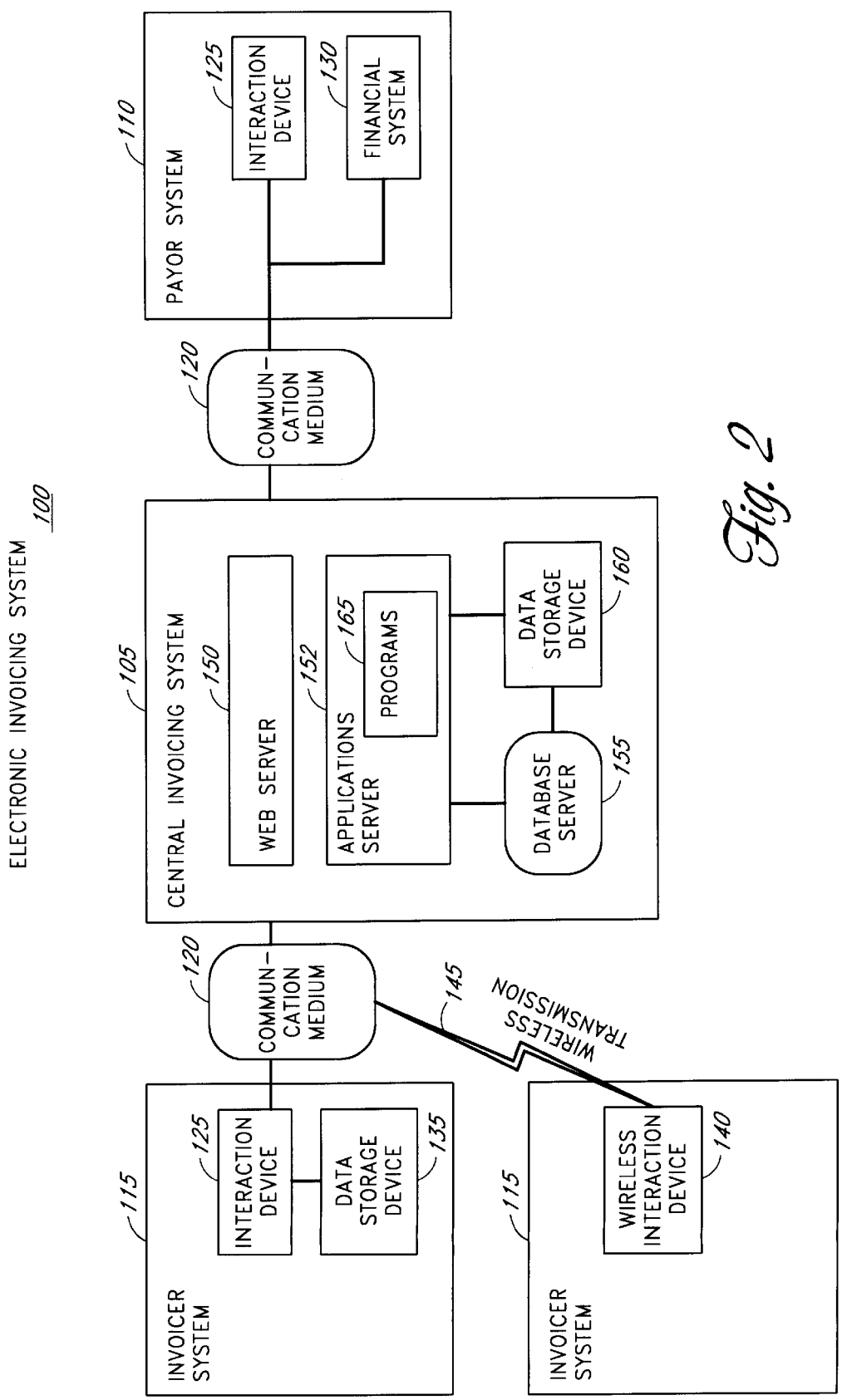
FIG. 2 illustrates a block diagram of the electronic invoicing system, according to aspects of an embodiment of the invention.

FIG. 2 illustrates a block diagram of the electronic invoicing system 100. As shown in FIG. 2, the payor system 110 includes an interaction device 125. According to one embodiment, the interaction device 125 comprises a device capable of displaying graphical and textual information, such as, for example, a web browser. According to another embodiment, the interaction device comprises any generic or customized device capable of displaying information. According to one embodiment of the invention, the payor system 110 also includes a financial system 130. According to one embodiment, the financial system 130 includes any financial or accounting system which records financial information, such as, for example, a general ledger program. In one embodiment, the financial system 130 resident on the payor's system 110 includes an appropriate financial system used by individuals or businesses such as, for example, financial systems provided by Oracle, SAP and PeopleSoft.

FIG. 2 also illustrates the invoicer system 115. According to one embodiment, the invoicer system 115 includes the interaction device 125. In another embodiment, the invoicer system 115 also includes a data storage device 135. In another embodiment, the invoicer system 115 includes a wireless interaction device 140. In one embodiment of the invention, the wireless interaction device 140 includes any device capable of transmitting information over a wireless network or communication system. For example, the wireless interaction device may transmit or receive information using cellular communications or wireless networks. The wireless interaction device 140 includes an appropriate wireless device capable of transmitting data such as, for example, a personal digital assistant (PDA), a cellular phone or cellular device, a laptop computer capable of wireless transmission, or the like. As illustrated in FIG. 2, the wireless interaction device 140 communicates with the communication medium 120 by a wireless transmission 145.

FIG. 2 illustrates the central invoicing system 105. As shown in FIG. 2, the central invoicing system 105 includes a web server 150, an applications server 152, a database server 155, and a data storage device 160. In one embodiment of the invention, the web server 150 includes an appropriate data routing device such as a conventional web server commercially available from Microsoft, Netscape, Apache, or the like. For example, a function of the web server 150 is to advantageously receive incoming data from and send outgoing data to the communication medium 120. As another example, a function of the web server 150 is to execute Active Server Pages (ASP) scripts used in the operations of the central invoicing system 105.

In one embodiment of the invention, the applications server 152 includes any server system capable of hosting and executing program files, such as, for example, Microsoft Windows NT, Microsoft Windows 2000, Linux, or the like. In one embodiment of the invention, the applications server 152 includes a programs 165. In one embodiment of the invention, the programs 165 includes all programs and functionality required to control and operate the central invoicing system 105 and all other components required to operate the central invoicing system 105. The programs 165 include appropriate programs used to operate the central invoicing system 105 such as, for example, custom components, and stand-alone executables written in a development environment such as, for example, Microsoft Visual Basic. The database server 155 includes an appropriate database server system such as, for example, Microsoft SQL Server 7.0. According to one embodiment, the database server 155 also connects to one or more data storage devices 160. The data storage device 160 includes an appropriate device for storing data such as, for example, a hard disk drive, a CD ROM, or the like.

Figure 3:
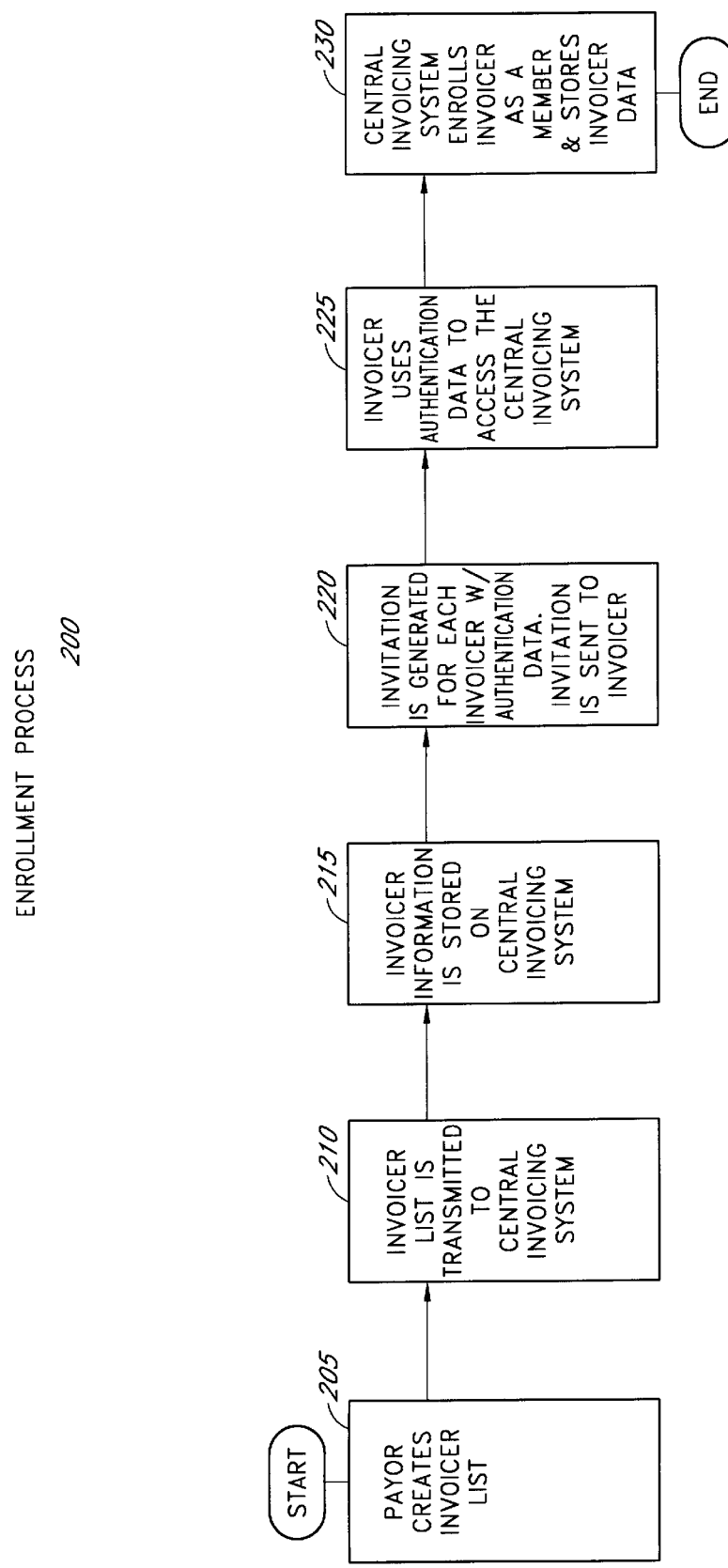
FIG. 3 illustrates a process flow diagram of an enrollment process, according to aspects of an embodiment of the invention.

FIG. 3 illustrates a process flow diagram of an enrollment process 200 according to aspects of an embodiment of the invention. As shown in FIG. 3, the enrollment process starts at state 205 when a payor creates a list of invoicers. According to one embodiment, the payor advantageously uses the interaction device 125 to connect via the communication medium 120 to a central invoicing system 105 to create the list of invoicers. The list of invoicers may include a plurality of invoicers.

After the list of invoicers is created, at state 210, the invoicer list is transmitted to the central invoicing system 105 by the interaction device 125. In one embodiment, the list of invoicers is transmitted through the communication medium 120 to the central invoicing system 105 using a secure transmission or connection such as, for example, Secure Internet Protocol (IPSec). Once the list of invoicers is received at the central invoicing system 105, at state 215, the invoicer information is stored on the central invoicing system 105. The invoicers are individually stored on the central invoicing system 105.

Once the invoicer information is stored, at state 220, an invitation and authentication data is generated for each invoicer. The authentication data is unique to that particular invoicer. That invitation is then sent to the appropriate invoicer by an appropriate means such as, for example, by mail. In one embodiment, the authentication data includes user name, password, and priority identification (I.D.) to enable the invoicer system 115 to connect to the central invoicing system 105.

Once the invoicer receives the invitation, at state 225, the invoicer may use the authentication data to access the central invoicing system 105 from the invoicer system 115. In one embodiment of the invention, the invoicer may use the invoicer system 115 with an interaction device 125 or a wireless interaction device 140 to connect the invoicer system 115 to the central invoicing system 105. Once connected, the invoicer can enter the authentication data to get access to the central invoicing system 105. Upon successful authentication, the invoicer is prompted by the central invoicing system 105 to enter pertinent invoicer information. The invoicer information is stored on the central invoicing system 105, and the invoicer is registered as an invoicer member of the central invoicing system 105, as illustrated in state 230. In one embodiment, the invoicer information include any pertinent data such as, for example, invoicer name, contact name, address, credit card information, phone number, fax number, email address, and the like.

Figure 4:
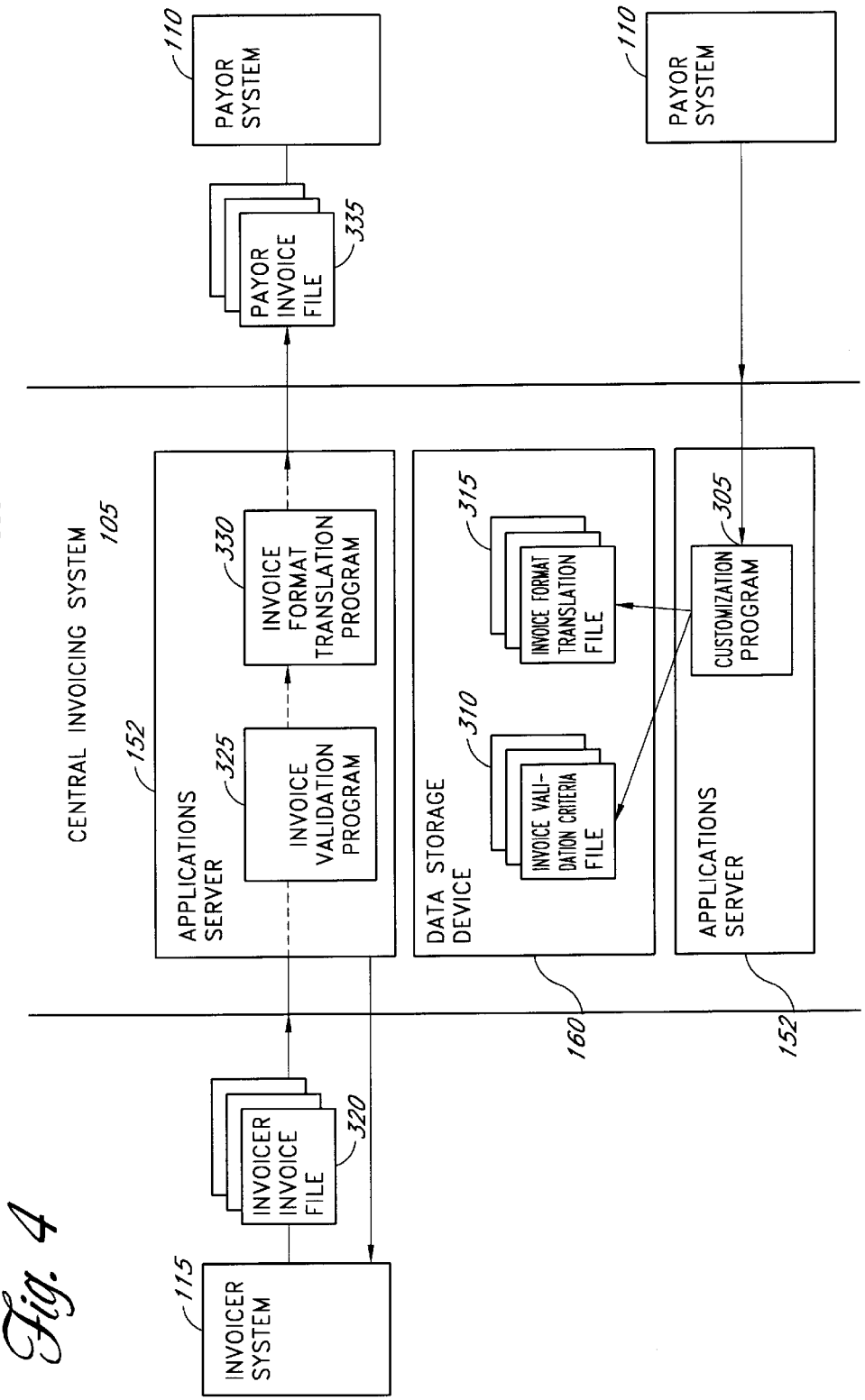
FIG. 4 illustrates a block diagram of an invoice validation and translation system, according to aspects of an embodiment of the invention.

FIG. 4 illustrates a block diagram of the invoice validation and translation system 300 according to aspects of an embodiment of the invention. According to one embodiment, the invoice validation and translation system 300 includes a customization program 305, a plurality of invoice validation criteria files 310, a plurality of invoice format translation files 315, an invoice validation program 325, and an invoice format translation program 330, advantageously residing on the central invoicing system 105.

As shown in FIG. 4, the payor system 110 accesses the customization program 305. The customization program 305 advantageously resides on the applications server 152. Using the customization program 305, the payor establishes the criteria for a valid invoice. The payor can therefore establish the format of the invoice by establishing which invoice data fields must exist for an invoice to be valid. Further, the payor may establish what constitutes acceptable values for the foregoing invoice data fields. For example, the payor can establish that a valid invoice must contain a purchaser order number. As another example, the payor can require that the value entered as the purchase order number be with a certain range of numbers. Also using the customization program 305, the payor establishes the format in which the payor wishes to receive the invoice files from the central invoicing system 105. For example, the payor can select the format used by the payor's financial system 130, such as, for example, a file format used by Oracle, SAP, and PeopleSoft systems, or the like.

As shown in FIG. 4, in one embodiment of the invention, the payor's criteria for a valid invoice is advantageously stored in the invoice validation criteria file 310. In one embodiment of the invention, the invoice validation criteria file 310 comprises an Extensible Markup Language (XML) file, and the invoice criteria is depicted as a set of rule within an XML file. In one embodiment of the invention a separate invoice validation criteria file 310 is created for each distinct payor. For example, to set the invoice number field as a mandatory field, the invoice validation criteria file 310, in the XML embodiment, may contain the following rule:

<Field Name="InvoiceNo">
  <EditType="1">
    <Message>The Invoice Number cannot be empty.</Message>
  </Edit>
</Field>

As another example, to require that the invoice date be after Jan. 1, 2000, the invoice validation criteria file 310; in the XML embodiment, may contain the following rule:

<Field Name="EntryDate">
  <Edit Type="1"/>
  <Edit Type="2"/>
  <Edit Type="6">
    <LowValue>01/01/2000</LowValue>
    <HighValue>12/31/9999</HighValue>
  </Edit>
</Field>

Although the invoice validation criteria file 310 is disclosed with reference to the foregoing embodiments, the invention is not intended to be limited thereby. Rather, a skilled artisan will recognize from the disclosure herein a wide number of alternative embodiments of the invoice validation criteria file 310, including almost any file format capable of containing readable invoice criteria rules.

As shown in FIG. 4, in one embodiment of the invention, the payor's desired invoice file format is advantageously stored in the invoice format translation file 315. In one embodiment of the invention, the invoice format translation file 315 comprises an Extensible Markup Language (XML) file. In one embodiment of the invention a separate invoice format translation file 315 is created for each payor.

When an invoicer wishes to submit multiple invoices to one or more payors, the invoicer, through the invoicer system 115, submits an invoicer invoice file 320 to the central invoicing system 105. The invoicer invoice file 320 comprises of one or more invoices from the invoice system 115. The invoicer invoice file 320 advantageously comprises a file format that can be parsed to ascertain its content such as, for example, a text file, a delimited text file, an XML file, or the like. The invoicer's system 115 may transfer the invoicer invoice file 320 to the central invoicing system 105 using an appropriate data transfer system such as, for example, File Transfer Protocol (FTP).

The invoice validation program 325 receives and processes the invoicer invoice file 320. The invoice validation program 325 parses the invoicer invoice file 320 to determine the intended payor. Once the intended payor is determined, the invoice validation program 325 retrieves the invoice validation criteria file 310 relating to that payor. The invoice validation program 325 compares the invoicer invoice file 320 with the invoice validation criteria file 310 to determine if the invoice file meets the payor's criteria. If the invoicer invoice file 320 meets the criteria, the invoices contained in the invoicer invoice file 320 are stored on the central invoicing system 105 for translation and transmission to the payor system 110. If the invoicer invoice file 320 does not meet the criteria, the invoices contained in the invoicer invoice file 320 are stored as draft invoices on the central invoicing system 105 and the central invoicing system sends a notification of the error to the invoicer system 115.

The valid invoices are processed by the invoice format translation program 330. The invoice format translation program 330 retrieves the invoice format translation file 315 relating the appropriate payor. According to the format prescribed by the invoice format translation file 315, the invoice format translation program 330 creates a payor invoice file 335. Therefore, the valid invoices are formed into the payor invoice file 335. In one embodiment of the invention, the invoice format translation program 330 includes an appropriate program for manipulating and reformatting the data contained in a text file or XML file such as, for example, a text manipulation program written in Microsoft Visual Basic.

For example, the invoice format translation file 315, in the XML embodiment, may include the following text:

<record id="2">
   <literal id="01" just="left" start="01" length="3">000</literal>
   <field id="02" just="left" start="4" length="16" format="">[InvoiceNo]</field>
   <field id="03" just="left" start="20" length="10" format="yyyy/mm/dd">[InvoiceDate]</field>
   <field id="04" just="left" start="30" length="10" format="">[CustVendorNbr]</field>
   <field id="05" just="left" start="40" length="3" format="00#">[TotalLines]</field>
   <field id="06" just="left" start="43" length="10" format="yyyy/mm/dd">[EntryDate]</field>
   <field id="07" just="right" start="53" length="17" format="#############0.00">[DN_TotalDue]</field>
   <field id="08" just="left" start="70" length="5" format="">[VendorTerms]</field>
   <field id="09" just="left" start="75" length="254" format="">[Notes]</field>
</record>

As shown in the foregoing example, the invoice number field is reformatted to start at the 4th character in the record and contains 16 characters. Also, as shown in the foregoing example, the invoice date field is reformatted to a "yyyy/mm/dd" format starting at the 20th character in the record an extending for 10 characters. As shown in the foregoing example, the other fields of the invoice can be reformatted in a similar fashion. Although the invoice format translation file 315 is disclosed with reference to the foregoing embodiments, the invention is not intended to be limited thereby. Rather, a skilled artisan will recognize from the disclosure herein a wide number of alternative embodiments of the invoice format translation file 315, including almost any file format capable of containing readable invoice format rules.

Once the invoices are reformatted, the central invoicing system 105 transmits the payor invoice file 325 to the payor system 110. The payor invoice file 325 is transmitted by the central invoicing system 105 to the payor system 110 using an appropriate data transfer system such as the File Transfer Protocol (FTP). Therefore, as illustrated in FIG. 4, the payor configures the format in which the payor wishes to receive invoices from the invoicer, and accordingly, the payor receives invoices in that format.

Figure 5A:
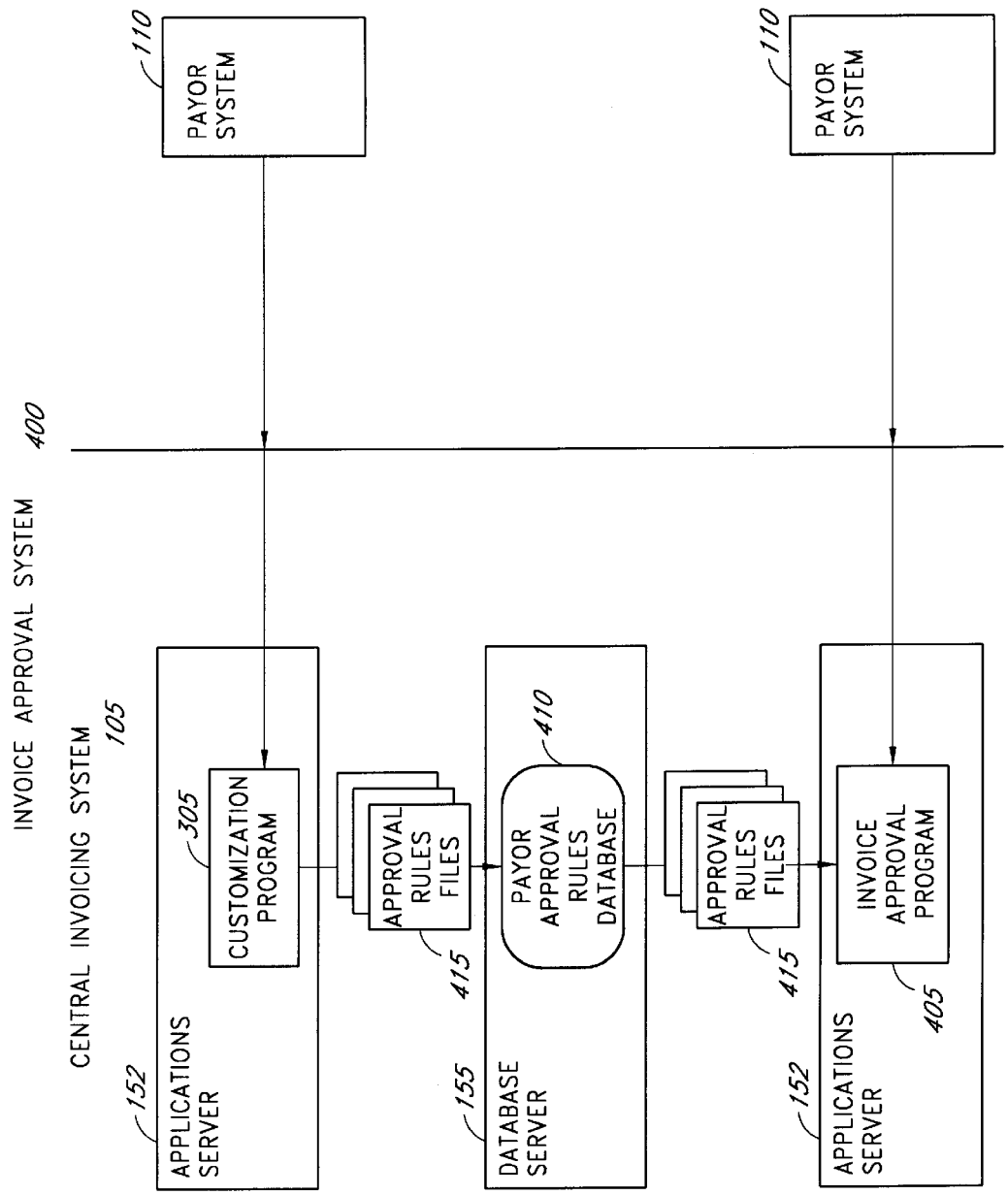

FIG. 5A illustrates a block diagram of an invoice approval system 400, according to aspects of an embodiment of the invention. As shown in FIG. 5A, the invoice approval system 400 includes the customization program 305, an invoice approval program 405, the payor approval rule database 410, and an approval rules file 415. As shown in FIG. 5A, the payor system 110 connects to the central invoicing system 105. Once the payor has established access to the central invoicing system 105, the payor system 110 uses the customization program 305 to create and modify the approval rules relevant to that payor's invoice approval hierarchy.

An approval rule is a logic rule that determines which members of the payor's organization can approve an invoice. For example, an approval rule can state that Jane Smith can approve only invoices where the amount of the invoice in less than $10,000. Another approval rule, for example, can state that John Smith can approve any invoice from a certain specific invoicer. The customization program 305 provides payors with a user interface to enter the approval rules.

FIG. 5B illustrates a diagram of the invoice approval rules entry screen 450, according to aspects of an embodiment of the invention. As illustrated in FIG. 5B the invoice approval rules entry screen 450 includes various data entry areas for entering approval rules. For example, the approval rules entry screen 450 can allow a payor to define a variety of approval criteria. The approval criteria can define who in an organization is authorized to approve certain invoices. Thus, the invoicing criteria can include by way of example a route identifier and a routing type. In addition, a description field can provide information about the invoice. The primary criteria can also define a wide variety of fields, the logical operators and the desired values.

For example, the approval rules can define which departments are to receive a particular invoice and who is authorized to approve an invoice. As illustrated in FIG. 5A, in one embodiment, the rules can define that a particular department such as ABC department within a payor's organization receive invoices from particular vendors. In addition, the rules can define that if an invoice exceeds $10,000, Jane Smith is authorized to approve the invoice. Thus, when an invoice from a particular vendor specifies ABC department and exceeds $10,000, the invoice approval system 400 will rely on the rules to route the invoice to Jane Smith for approval. Although the invoice approval rules and the invoice approval rules entry screen 450 is disclosed with reference to the foregoing embodiments, the invention is not intended to be limited thereby. Rather, a skilled artisan will recognize from the disclosure herein a wide number of alternative embodiments of the invoice approval rules entry screen 450, including almost any system for receiving invoice approval rules from a payor.

After the payor has used the customization program 305 to create approval rules, the customization program 305 stores the approval rules file 415 into the payor approval rules database 410.

As illustrated in FIG. 5A, the payor system 110 connects to the central invoicing system 105. The central invoicing system 105 prompts the payor for a username and password. The central invoicing system 105 authenticates the payor's username and password. Upon successful authentication, the payor gains access to the central invoicing system 105, and may use the invoice approval program 405.

In one embodiment, the invoice approval program 405 retrieves the approval rules file 415 from the payor approval rules database 410. Using the approval rules file 415 and the username and password entered by the payor, the invoice approval program 405 determines the approval rule pertinent to that payor. The invoice approval program 405 then allows the payor to approve the invoices that that particular payor is authorized to approve. In one embodiment, the approval rules file 415 includes an appropriate data structure containing approval rules such as, for example, a text file, an XML file, or the like.

Figure 6A:
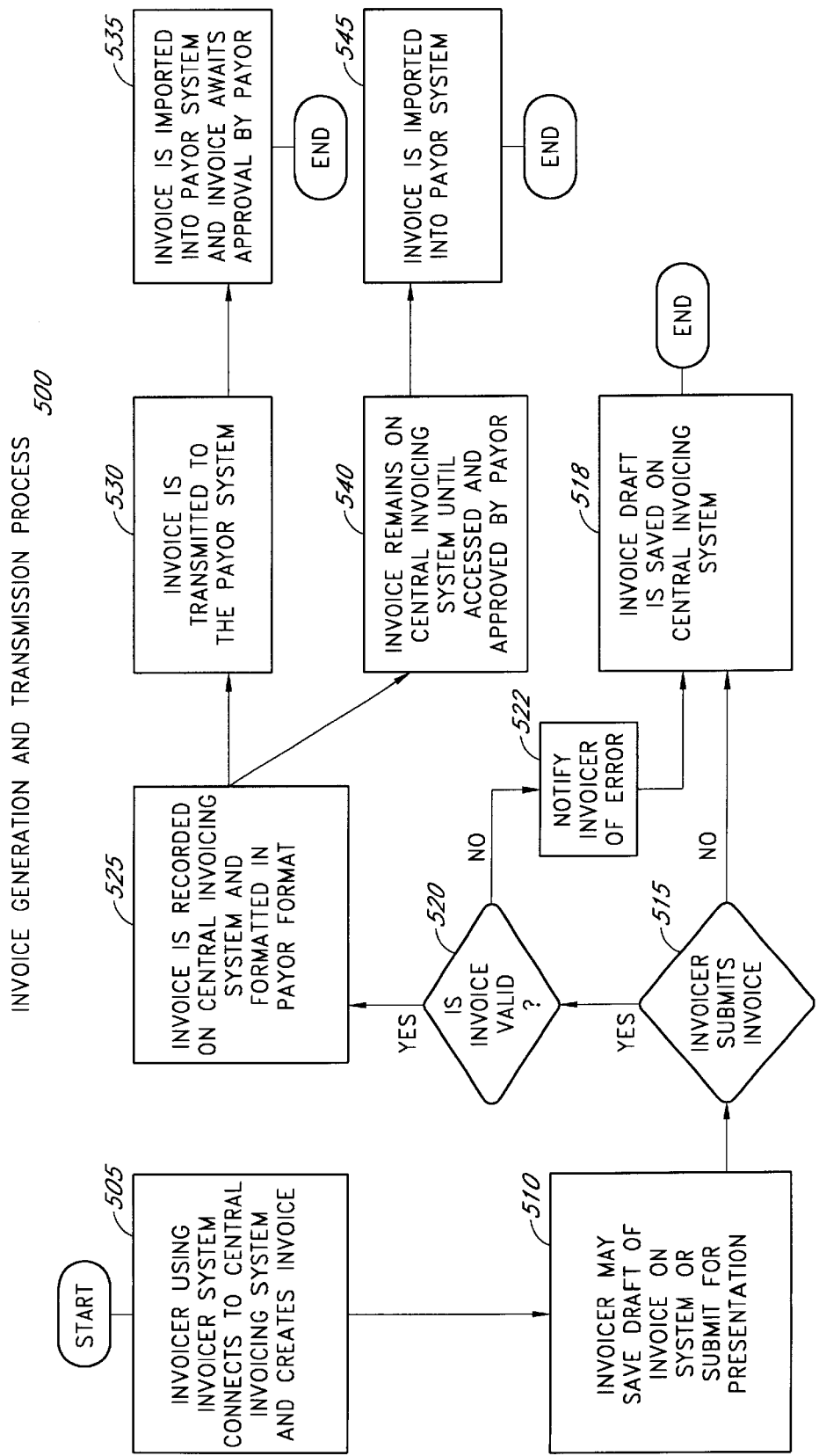

FIG. 6A illustrates a process flow diagram of an invoice generation and transmission process 500, according to aspects of an embodiment of the invention. As shown in FIG. 6A, the invoice generation and transmission process 500 starts at state 505 when an invoicer using the invoicer system 115 connects to the central invoicing system 105 and creates an invoice. In one embodiment of the invention, the invoicer system 115 advantageously uses an Internet interaction software implementing scriptable screen objects such as, for example, Microsoft Internet Explorer, or the like, to create an invoice. In another embodiment, the invoicer system 115 can create an invoice using appropriate Internet interaction software such as, for example, Netscape Navigator, or the like.

Figure 6B:
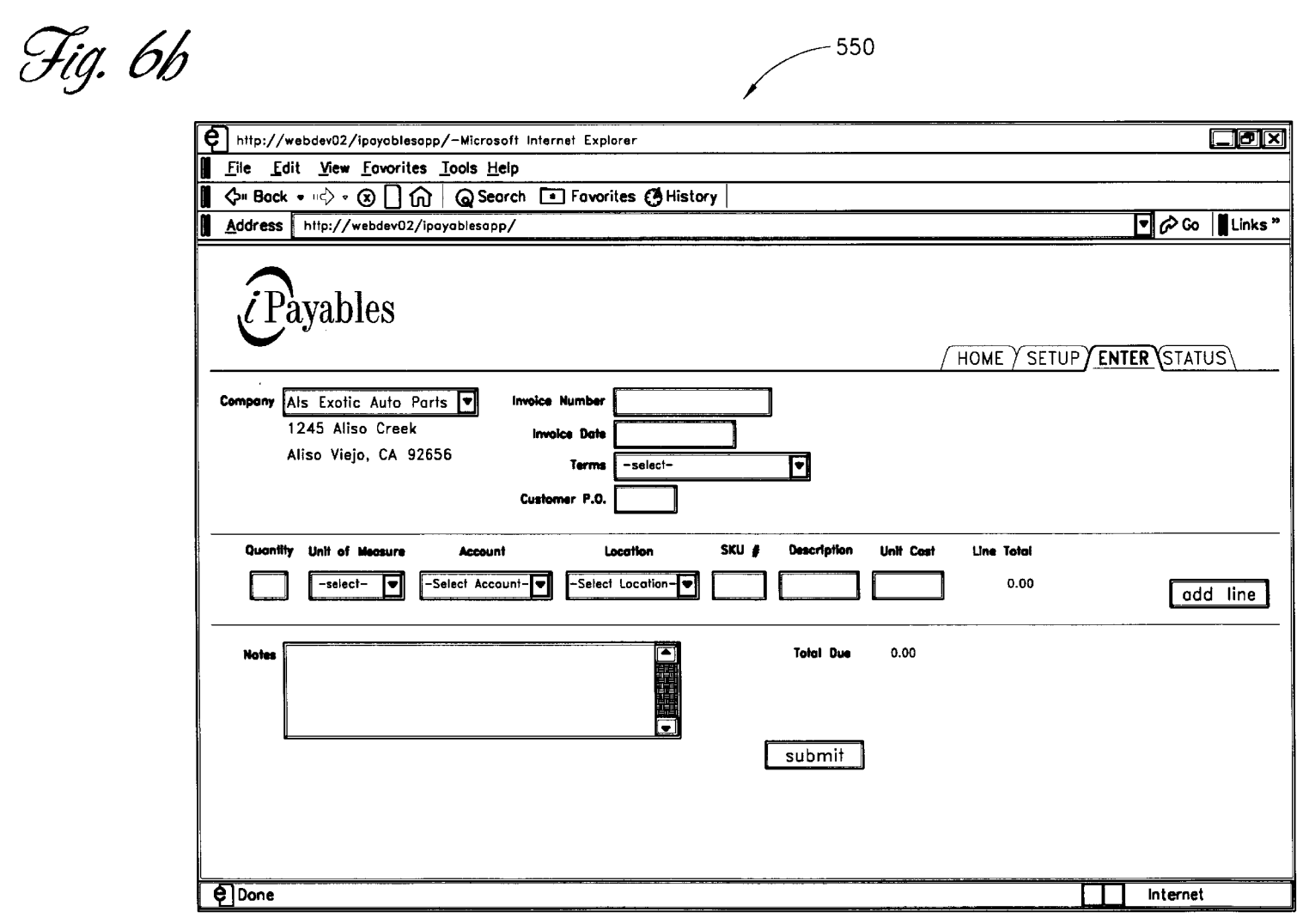

FIG. 6B illustrates a diagram of the invoice entry screen 550, according to aspects of an embodiment of the invention. As illustrated in FIG. 6B, the invoice entry screen 550 includes appropriate data fields In one embodiment of the invention, the invoicer uses the screen to create an invoice. When the invoicer selects a particular payor, the invoice entry screen 550 dynamically varies the displayed entries to correspond to the payor's desired invoicing format. For example, the invoicing format can vary to specify the amount of data that an invoicer desires, the type of data that the payor desires and the format of the data.

For example, the entry screen 550 can have different terms that correspond to different payors, different units of measure, different accounts, different locations and the like. In one embodiment, the invoice entry screen 550 displays the invoicing format the has been approved by the payor. In another embodiment, the invoice entry screen 550 on the invoicer computer only displays data from payors that are willing to accept invoices from the invoicer.

In one embodiment, the invoice entry screen 550 obtains multiple invoicing formats from the central invoicing system 105. In another embodiment, the invoice entry screen 550 obtains the proper invoicing format from the central invoicing system 105 when the invoicer selects a particular payor. In yet another embodiment, only those invoicing formats that a invoicer is authorized to use are displayed on the invoice entry screen 550.

The invoice entry screen 550 can vary the invoicing format in response to the invoicer's selection of a particular payor. For example, if the invoicer selects payor A the terms acceptable by payor A can be displayed on the invoice entry screen 550. If the invoicer selects payor B, different payment terms specified by payor B may be displayed. Indeed, the invoice entry screen 550 can vary virtually any field that a payor may desire to be customized.

Furthermore, the invoicer can store draft versions of the invoice until the invoicer is ready to submit the invoice to a desired payor. These draft versions can be stored on the central invoicing system 105 or on the invoicer system 115. Once the draft versions are complete, the invoicer can direct the central invoicing system 105 to present the invoice to the payor system 110.

After the invoice is created, at state 510, the invoicer may, at state 515, choose to save a draft of the invoice on the central invoice system 105 or choose to submit the invoice for presentment to the payor. If the invoicer does not choose to submit the invoice in state 515, then at state 518 the invoice draft is saved on the central invoicing system 105. If the invoicer chooses to submit the invoice at state 515, then at state 520, the central invoicing system 105 determines whether the invoice is valid, as illustrated in FIG. 4. If the invoice is not valid, then at state 522, the invoicer is notified of the error, as illustrated in FIG. 4, and a draft of the invoice is saved on the central invoicing system 105.

If the invoice is valid at state 520, the invoice is recorded on the central invoicing system 105 and then it is formatted in the payor's format as illustrated in FIG. 4. If the invoicer had chosen to submit the invoice, then after state 525, the central invoicing system 105 may transmit the invoice to the payor system 110, or retain the invoice until the payor accesses the central invoicing system 105 to approve the invoice. If the invoice is to be transmitted, then in state 530, the invoice is transmitted to the payor system 110 as illustrated in FIG. 4.

Once the invoice is transmitted to the payor system 110, at state 535, the invoice is imported into the payor's financial system 130 and the invoice remains at the financial system 130 awaiting approval by payor. If the payor is to access the central invoicing system 105 to approve the invoice, then at state 540, the invoice remains on the central invoicing system 105 until accessed and approved by payor. Once approved by the payor, at state 545 the invoice is imported into the payor's financial system 130.

FIG. 7 illustrates a block diagram of an invoice file consolidation system 600 according to aspects of an embodiment of the invention. According to FIG. 7, the invoice file consolidation system 600 includes a database update program 605, an invoice database 610, a database query program 615 and the payor invoice file 325 of FIG. 4.

According to one embodiment of the invention, a plurality of the invoicer systems 115 transmit invoicer invoice files 320 to the central invoicing system 105. The central invoicing system 105 receives each of the invoicer invoice files 320 and validates the format of the received invoices using the invoice validation program 325, as illustrated in FIG. 4. If the invoicer invoice files 320 are in a valid format, the database update program 605 records the invoice information contained in each invoicer invoice file 320 onto the invoice database 610. In one embodiment of the invention, the invoicer invoice file 320 may contain invoice information for a plurality of payors.

The database update program 605 includes an appropriate program for writing data to a database such as, for example, a program using Structured Query Language (SQL).

Through the operation of the database query program 615, invoice information particular to a payor is extracted from the invoice database 610. Using the extracted data, the database query program 615 composes the payor invoice file 325 which is then transmitted to the payor system 110. The database query program 615 includes an appropriate program for retrieving data from a database such as, for example, a program using Structured Query Language (SQL).

Figure 8:
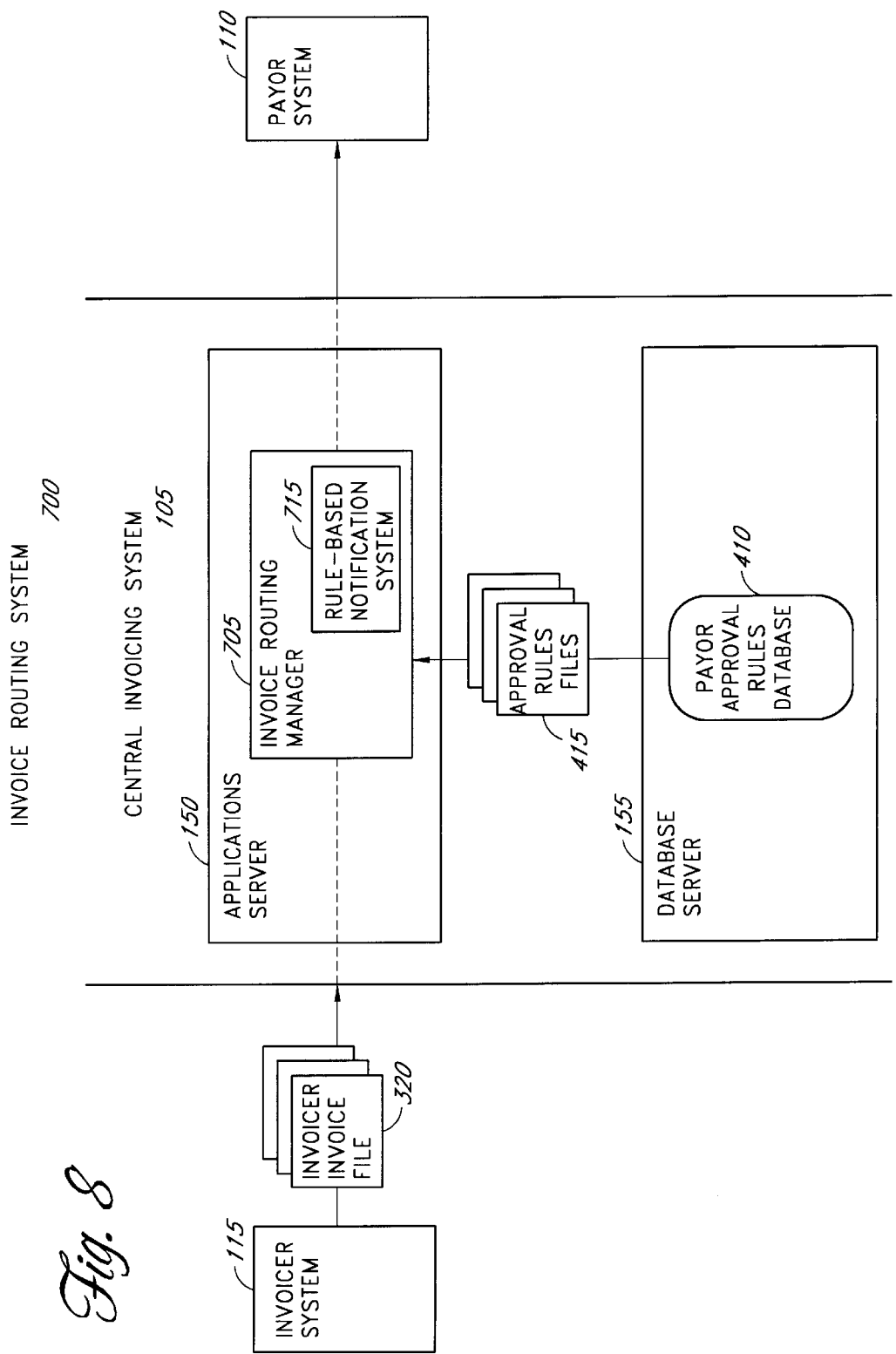
FIG. 8 illustrates a block diagram of an invoice routing system, according to aspects of an embodiment of the invention.

FIG. 8 illustrates a block diagram of an invoice routing system 700 according to aspects of an embodiment of the invention. As shown in FIG. 8, an invoice routing system 700 includes an invoice routing manager 705, a rule base system 715, the payor approval rules database 410, and the approval rules file 415. According to one embodiment of the invention, the invoicer system 115 transmits the invoicer invoice file 320 to the central invoicing system 105 as illustrated in FIG. 4. The invoice routing manager 705 retrieves the approval rules file 415 from the payor approval rules database 410.

The invoice routing manager 705 advantageously uses the approval rules file 415 and the invoicer invoice file 320 to determine how to route the invoice information contained in invoicer invoice file 320 to the payor system 110. Using the rule base notification system 715, the invoice routing manager 705 transmits notification to the payor system 110. The rule-based notification system 715 is an appropriate system for notifying third parties by transmitting a notification, such as, for example, an email, or the like. For example, if a payor has established a rule that only John Smith can approve an invoice from Acme, Inc., once an invoice arrives from Acme, Inc., John Smith is notified that an invoice awaits his approval. As another example, if several people may approve invoices from Acme, Inc., all of those people may receive an invoice notifying them that an invoice awaits their approval.

Figure 9:
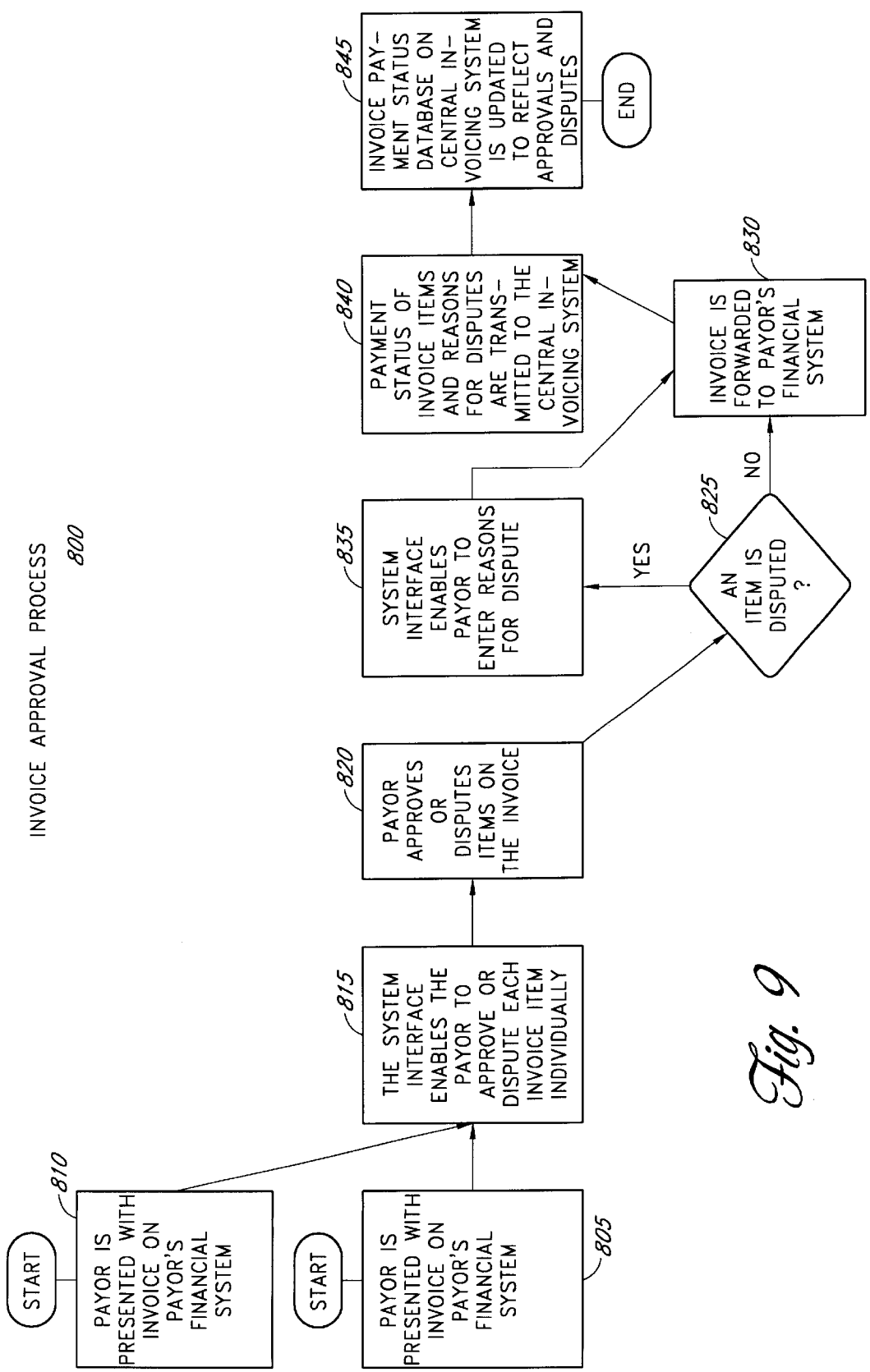
FIG. 9 illustrates a process flow diagram of an invoice approval process, according to aspects of an embodiment of the invention.

FIG. 9 illustrates a process flow diagram of an invoice approval process 800 according to aspects of an embodiment of the invention. As illustrated in FIG. 9, the invoice approval process 800 may start at state 805 when the payor is presented with an invoice on the payor's financial system 130. The invoice approval process 800 may also start at state 810 when the payor accesses the central invoicing system 105 and is presented with an invoice. Once the payor is presented with an invoice in state 805 or in state 810, then, in state 815 the system interface enables the payor to approve or dispute each invoice item individually.

Figure 10:
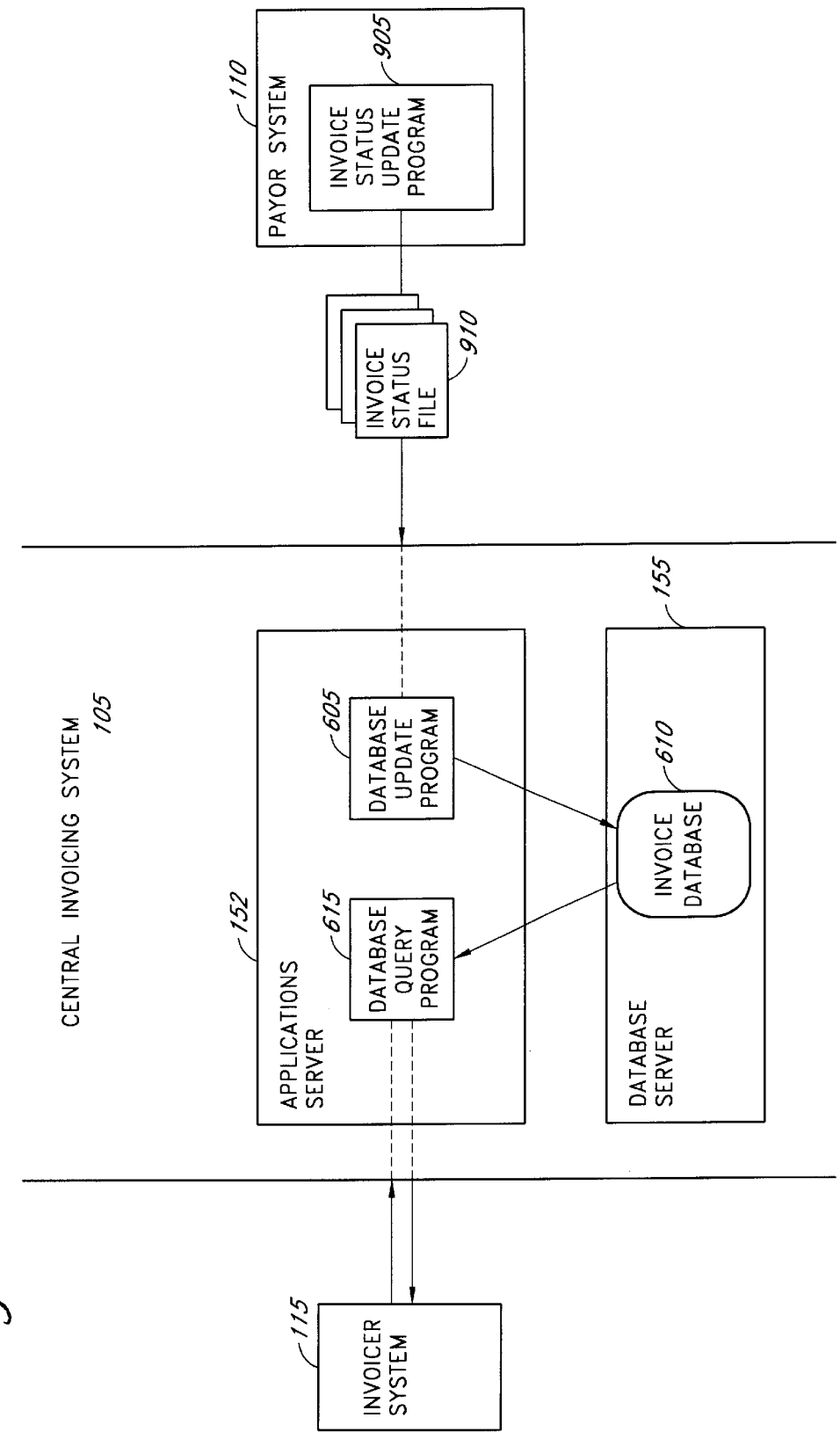
FIG. 10 illustrates a block diagram of an invoice status viewing system, according to aspects of an embodiment of the invention.

At state 820, the payor approves or disputes items on the invoice. If at state 825, the item is not disputed, then the process moves to state 830, the invoice is forwarded to the payor's financial system 130. If an item is disputed in state 825, then the process moves to state 835, where the system interface enables the payor to enter reasons for the dispute. At state 835, once the payor enters reasons for disputes, then the process moves to state 830, and the invoice is forwarded to payor's financial system 130. Once the invoice is forwarded, at state 840, payment status of invoice items and reasons for disputes are transmitted to the central invoicing system 105 as illustrated in FIG. 10. Once that information is transmitted, at state 845 the invoice database 610 on central invoicing system 105 is updated to reflect the approvals and disputes as illustrated in FIG. 10.

FIG. 10 illustrates a block diagram of the invoice status viewing system 900 according to aspects of an embodiment of the invention. As shown in FIG. 10, the invoice status viewing system 900 includes an invoice status update program 905, an invoice status file 910, the database update program 605, the invoice database 610, and the database query program 615. In one embodiment, the invoice status update program 905 advantageously resides on the payor's system 110. In one embodiment of the invention, the invoice status update program 905 comprises any computer program or system capable of composing invoice status information into a file structure such as for example, a program written in Microsoft Visual Basic, C++, or the like.

In one embodiment of the invention, to update the central invoicing system 105 of the payment status of invoices, the payor executes the invoice status update program 905 on the payor system 110. Upon execution, the invoice status update program 905 generates an invoice status file 910. The invoice status file 910 includes an appropriate file structure for containing invoice information such as, for example, an Extensible Markup Language (XML) file, a text file, or the like. The invoice status file 910 is transmitted by the payor system 110 to the central invoicing system 105 using an appropriate secure connection such as, for example, a Virtual Private Network (VPN) or a Secure Socket Layer (SSL).

Upon transmission from the payor system 110 to the central invoicing system 105, the web server 150 routes the invoice status file 910 to applications server 152. Thereafter, the database update program 605, which advantageously resides on the applications server 152, receives the invoice status file 910 and appropriately updates the invoice database 610. Therefore, the invoice database 610 contains the status of all invoice files transmitted to the central invoicing 105 by the payor system 110.

If an invoicer wishes to view the status of its submitted invoices, as illustrated in FIG. 10, the invoicer system 115 connects to the central invoicing system 105. In one embodiment of the invention, the invoicer system 115 connects to the central invoicing system 105 using the interaction device 125 and an appropriate secure connection such as, for example, a Virtual Private Network (VPN) or a Secure Socket Layer (SSL).

Once connected to the central invoicing system 105, the invoicer, using the interaction device 125, may request a report of the payment status of the invoicer's submitted invoices. Once the request is received from the invoicer system 115, the database query program 615 retrieves invoice information related to that invoicer from the invoice database 610. Once the database query program 615 receives the query results from the invoice database 610, the central invoicing system 105 then transmits that information to the invoicer system 115 using an appropriate secure connection such as, for example, a Virtual Private Network (VPN) or a Secure Socket Layer (SSL).

Figure 11:
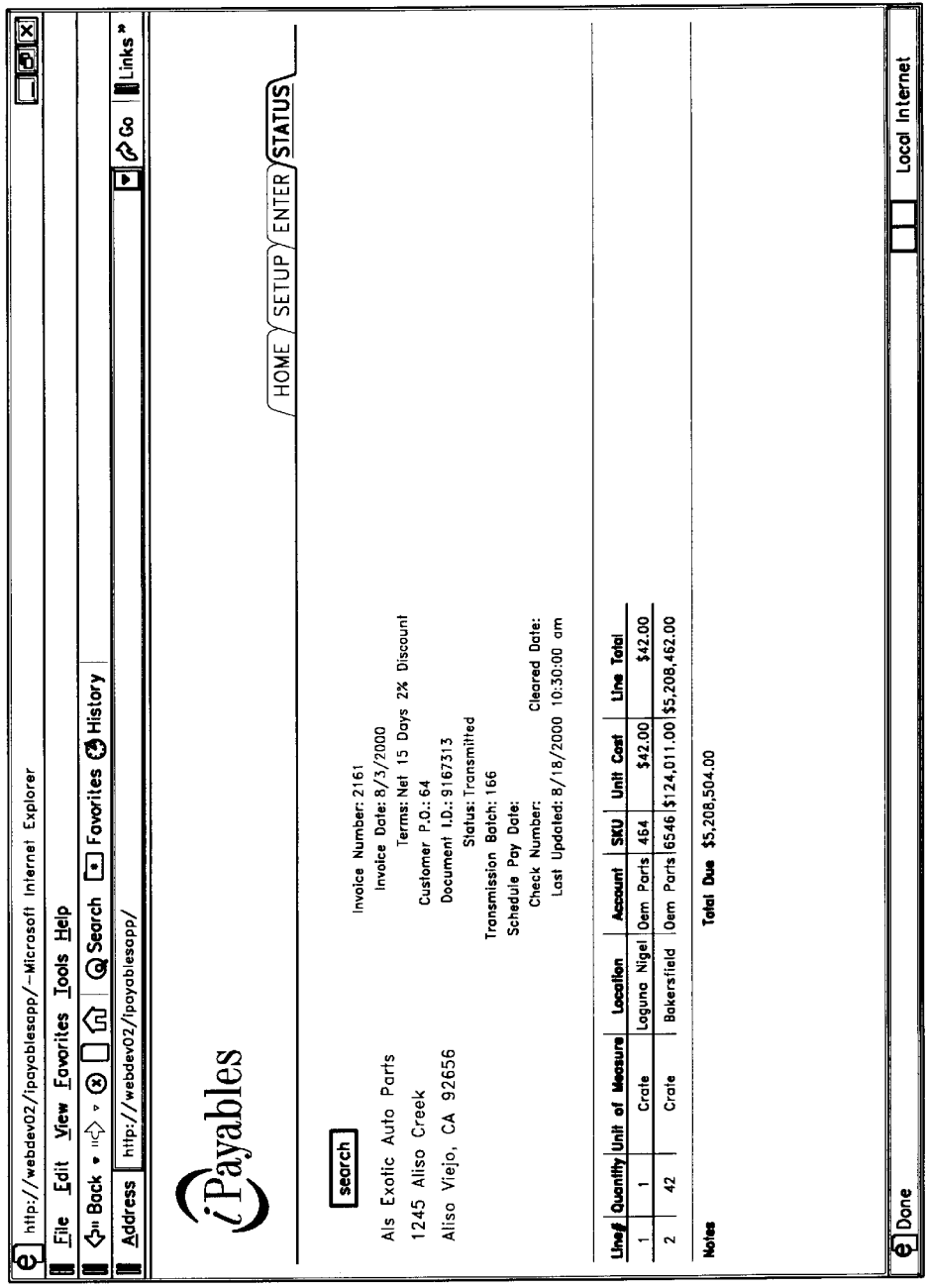
FIG. 11 illustrates a diagram of an invoice status screen, according to aspects of an embodiment of the invention.

FIG. 11 illustrates a screenshot of the invoice status screen 950. As illustrated in FIG. 11, the invoice status screen 950 includes invoice payment status information. In one embodiment of the invention, the invoice status screen 950 includes data display fields for invoice number, transmission status, scheduled payment date, cleared date, and other appropriate invoice information. Also, as shown in FIG. 11, the invoice status screen 950 advantageously includes information on the contents of the initial invoice submitted to the central invoicing system 105 by the invoicer system 115. Thus, the invoicer can view the payment status of previously submitted invoices on the invoicer system 115.

Figure 12:
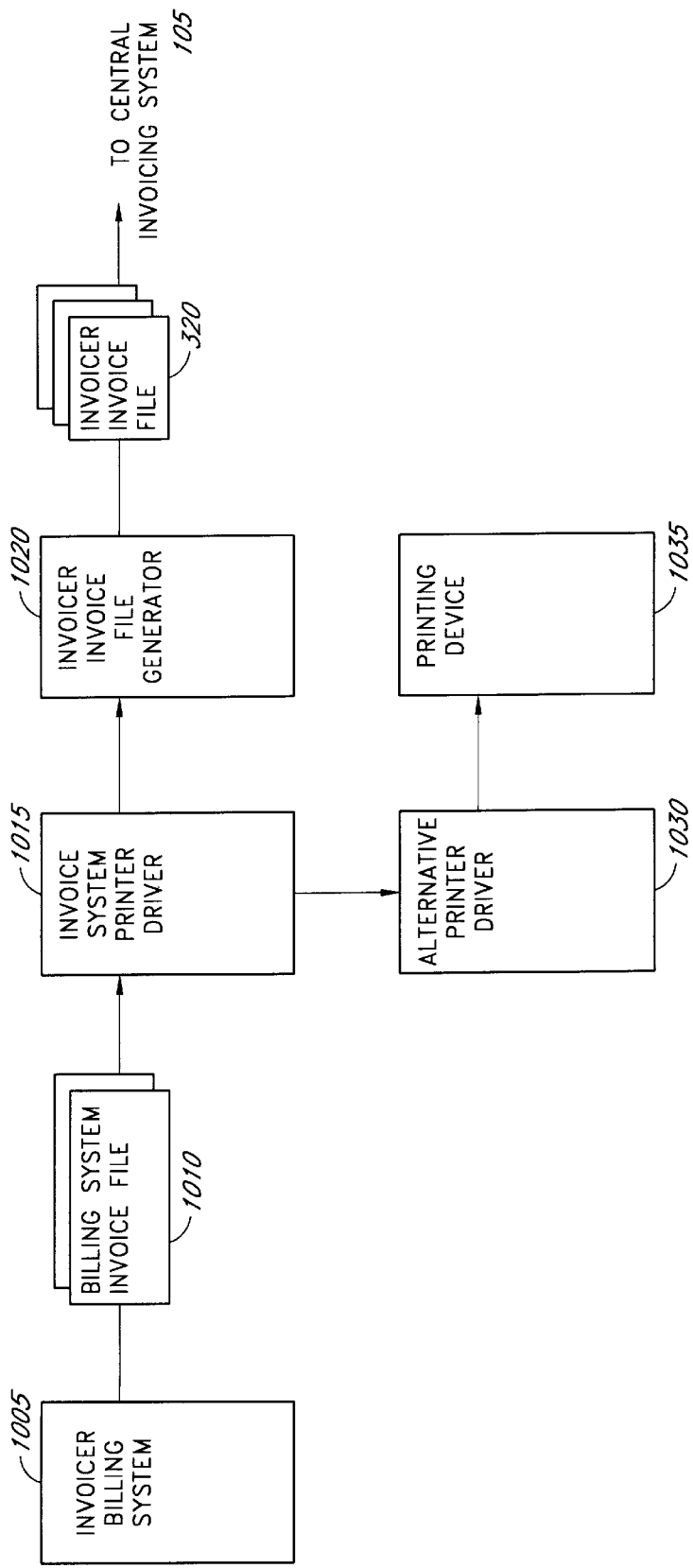
FIG. 12 illustrates a block diagram of an invoice submission printer driver, according to aspects of an embodiment of the invention.

FIG. 12 illustrates a block diagram of an invoice submission printer driver 1000 according to aspects of an embodiment of the invention. As shown in FIG. 12, the invoice submission printer driver 1000 includes an invoicer billing system 1005, the billing system invoice file 1010, an invoice system printer driver 1015, an invoicer invoice file generator 1020, an alternative printer driver 1030, and a printing device 1035.

As illustrated in FIG. 12, the invoicer billing system 1005 creates and transmits a billing system invoice file 1010 to the invoice system printer driver 1015. According to one embodiment, the invoicer billing system 1005 comprises a third party program used by individuals and organizations to perform invoicing, billing and other financial activities. The invoicer billing system 1005 includes software systems such as, for example, Microsoft Money, Quicken, or the like. In one embodiment, the billing system invoice file 1010 is the file output of the invoicer billing system 1005. Therefore, the billing system invoice file 1010 will be in a file format used by the invoicer billing system 1005 such as a file format used by Microsoft Money, Quicken, or the like. These file formats include text files, delimited files, Extensible Markup Language (XML) files, and the like.

Figure 13:
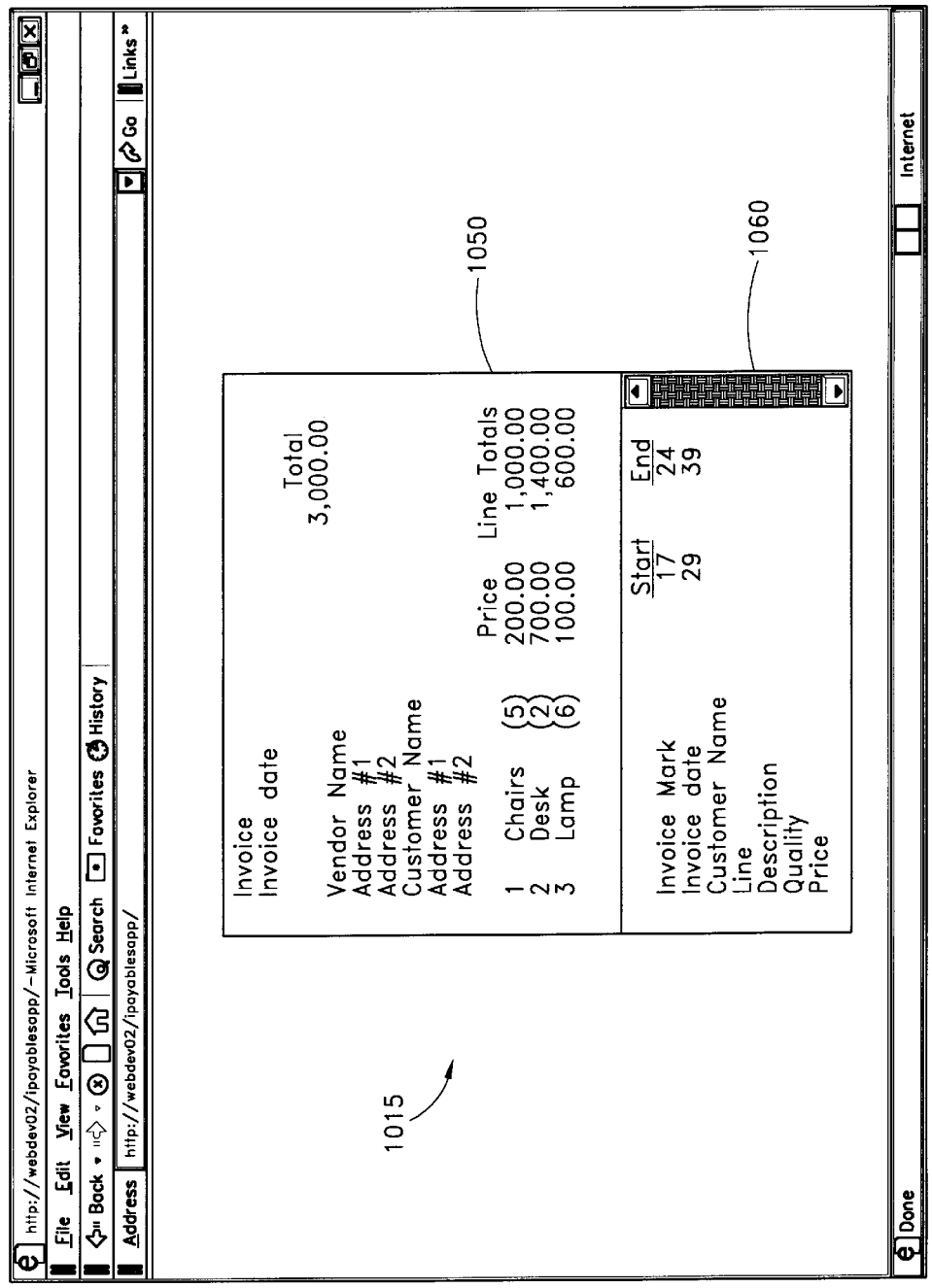
FIG. 13 illustrates an embodiment of a printer driver configure tool.

The invoice system printer driver 1015 advantageously correlates the fields in the billing system invoice file 1010 with the fields in the invoice that the invoicer wishes to submit to the payor. The invoice system printer driver 1015 accomplishes this by displaying the an invoice from the billing system invoice file 1010 on the invoicer's computer screen as illustrated in FIG. 13. The invoice system printer driver 1015 then prompts the invoicer to select various areas on the screen that correspond to fields in the invoice.

Once area is selected, the invoice system printer driver 1015 then correlates that field with the appropriate field in the invoice. The invoicer invoice file generator 1020 then uses the invoice field correlation made by the invoice system printer driver 1015 to create an invoicer invoice file 320. For example, the invoice system printer driver 1015 may prompt the invoicer to select the portion of the screen that displays the invoice number. Once the payor selects the appropriate area, the invoice system printer driver 1015 then correlates that area with the invoice number field of the outgoing invoicer invoice file 320. Thereafter, whenever the invoicer outputs the billing system invoice file 1010, the invoice system printer driver 1015 can ascertain the content of invoice number field.

In one embodiment, the invoice system printer driver 1015 displays the invoice data in a print preview pane 1050. When the invoicer highlights the fields displayed in the print preview pane 1050, a second pane 1060 displays the start and end points. For example, when the invoicer highlights the invoice data in the print preview pane, the invoice system printer driver 1015 displays the start and stop points in the second pane 1060. In one embodiment, the invoice system printer driver 1015 then stores these start and stop points for use with other invoices to thereby extract from the other invoices the data. The invoice system printer driver 1015 can then format this data into a variety of data format such as in the XML data format.

Once the invoicer invoice file 320 has been composed by the invoicer invoice file generator 1020, the invoicer invoice file 320 is then transmitted to the central invoicing system 105. In one embodiment, the invoice system printer driver 1015 advantageously resides on the invoicer system 115 as a printer driver which is used by the operating system of the invoicer system 115 to control and carryout printing. Instead of printing the invoices the invoice printer driver advantageously uses the invoicer invoice file generator 1020 to generate the invoicer invoice file 320 to transmit the invoicer invoice file 320 to the central invoicing system 105. If the invoicer does not wish to use the invoicer printer system 1015 to transmit invoices to the central invoicing system 105, then alternatively the invoicer may use the functionality of the alternative printer driver 1030 as illustrated in FIG. 12. The alternative printer driver 1030 then sends the invoices to the printing device 1035 for printing. The printing device 1035 includes any device capable of creating hard copies of data such as a laser printer, a dot matrix printer, or the like. The printing device 1035 includes printers provided by Hewlett-Packard, Canon, Xerox, or the like.

A skilled artisan will recognize the appropriate method for installing the invoice submission printer driver 1000 onto the invoicer system, including the method for installing third party printer drivers on an operating system. For example, the invoice submission printer driver 1015 can be installed onto a Microsoft Windows operating system by the use of Microsoft Window's Control Panel functionality to configure the invoice submission printer driver 1015 as the printer driver on that operating system.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion, but should be defined by the appended claims.

What is claimed is:

1. In a computer system, a method of providing to vendors electronic invoicing formats desired by different payors, the method comprising:

storing at a website a plurality of electronic invoicing formats that correspond to a plurality of payors;

storing at the website authorized vendor data wherein the authorized vendor data defines which vendors are authorized to use the invoicing formats of particular payors;

selecting at a vendor computer, a payor to invoice; and dynamically varying, based on the selected payor and the authorized vendor data, the display at the vendor computer to reflect the electronic invoicing format that the vendor is authorized to use when invoicing the payor.

2. The method of claim 1 wherein the act of dynamically varying, varies the format of the data specified in an invoice.

3. The method of claim 1 wherein the act of dynamically varying, varies the amount of data specified in an invoice.

4. The method of claim 1 wherein the act of dynamically varying, varies the arrangement of data in an invoice.

5. The method of claim 1 wherein the act of dynamically varying, varies the unit of measure specified in an invoice.

6. The method of claim 1 wherein the act of dynamically varying, varies the account number specified in an invoice.

7. The method of claim 1 wherein the act of dynamically varying, varies the location specified in an invoice.

8. In a computer system, a method of providing to vendors electronic invoicing formats desired by different payors, the method comprising:

storing in a computer accessible storage medium a plurality of electronic invoicing formats that correspond to a plurality of payors;

storing in a computer accessible storage medium vendor data wherein the vendor data defines which vendors are authorized to use the invoicing formats of particular payors; and displaying at the vendor computer the electronic invoicing format that the vendor data indicates that the vendor is authorized to use when invoicing the payor.

9. The method of claim 8 wherein the act of displaying varies the invoicing format displayed on the vendor computer when a different payor is selected.

10. The method of claim 8 wherein the computer accessible storage medium is accessed via the Internet.

11. The method of claim 8 wherein the computer accessible storage medium is accessed via a wireless network.

12. The method of claim 8 wherein the computer accessible storage medium is accessed via an electronic network.

13. The method of claim 8 wherein the vendor data lists the vendors that are authorized to use specific payor invoicing formats.

14. In a website that is accessible by multiple vendors, a method of assisting the vendors to obtain the proper electronic invoicing formats accepted by different payors, the method comprising:

storing at a website a plurality of electronic invoicing formats that correspond to a plurality of payors;

storing at the website authorized vendor data provided by the plurality of payors wherein the authorized vendor data defines which vendors are authorized to use the invoicing formats of particular payors; and providing at least one electronic invoicing format to the vendor that the vendor data indicates that the vendor is authorized to use.

15. The method of claim 14 wherein the act of providing downloads an electronic invoice format for a particular payor.

16. The method of claim 14 wherein the act of providing downloads multiple electronic invoice formats for multiple payors.

17. An electronic invoicing system that is configured to provide to vendors electronic invoicing formats desired by different payors, the electronic invoicing system comprising:

a computer accessible storage medium that is configured to store a plurality of electronic invoicing formats that correspond to a plurality of payors, the computer accessible storage medium further configured to store vendor data that defines which vendors are authorized to use the invoicing formats of particular payors; and processor circuitry that is in communication with the computer accessible storage medium and at least one vendor computer wherein the processor circuitry is configured to determine based on the vendor data whether a vendor computer is authorized to use the electronic invoicing format of a selected payor and if so, the processor circuitry is further configured to provide the electronic invoicing format of the selected payor to the vendor computer.

18. The system of claim 17 wherein the different electronic invoice formats varies the arrange of data.

19. The system of claim 17 wherein the electronic invoice formats vary the format of the data specified in an invoice.

20. The system of claim 17 wherein the vendor data lists the vendors that are authorized to use specific payor invoicing formats.

21. The system of claim of claim 17 wherein the processor circuitry is accessible by the vendor computer via a network.

22. The system of claim of claim 17 wherein the processor circuitry is part of a website.

23. In a website that is accessible by multiple vendors, a method of allow a payor to define which vendors are authorized to use a particular invoicing format, the method comprising:

storing at a website a plurality of electronic invoicing formats that correspond to at least one payor; and storing at the website authorized vendor data provided by the payor wherein the authorized vendor data defines which electronic invoicing formats may be used by different vendors.

* * * * *

UNITED STATES PATENT AND TRADEMARK OFFICE
CERTIFICATE OF CORRECTION

PATENT NO. : 6,826,542 B1
DATED : November 30, 2004
INVENTOR(S) : Kenneth L. Virgin It is certified that error appears in the above-identified patent and that said Letters Patent is hereby corrected as shown below:

<u>Column 18,</u>
Line 15, delete "claim 17" and insert -- claim 18 --.
Lines 20 and 22, after "of claim" delete "of claim".

Signed and Sealed this

Fourth Day of April, 2006

JON W. DUDAS
*Director of the United States Patent and Trademark Office*